July 27, 1937.  L. B. BROERING ET AL  2,088,130
TIRE RETREADING MOLD
Filed May 14, 1934   3 Sheets-Sheet 3
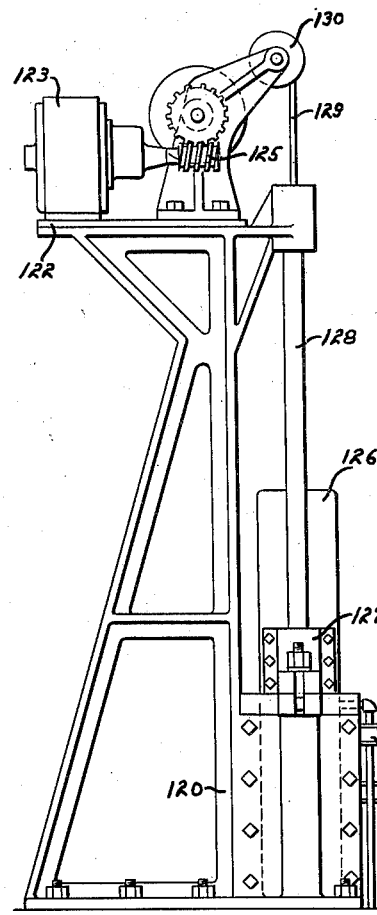
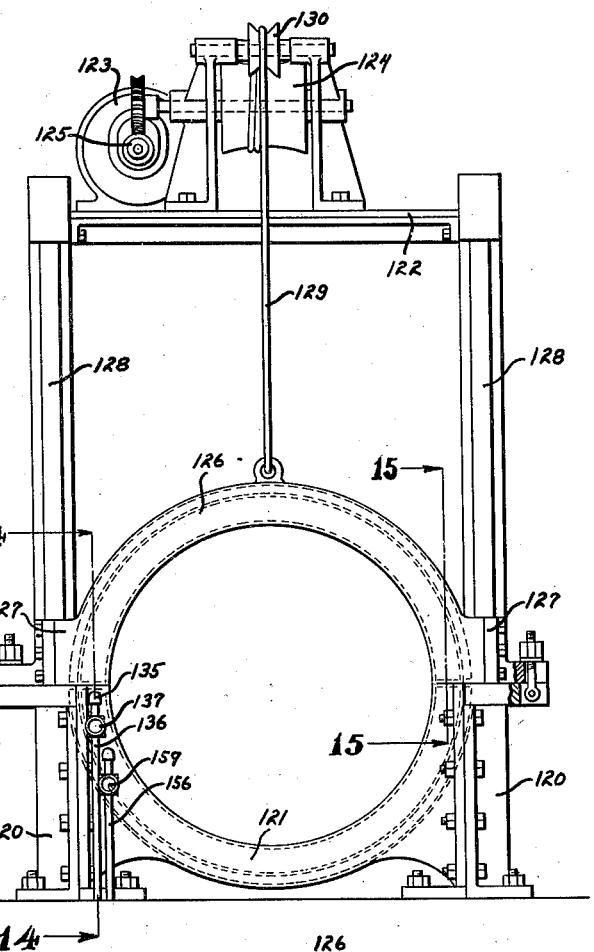
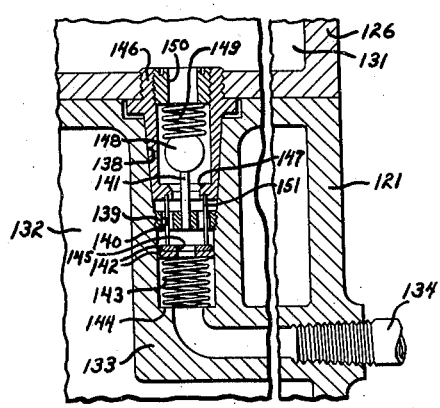
INVENTORS.
L. B. BROERING
F. E. KITE
BY
B J Craig
ATTORNEY.

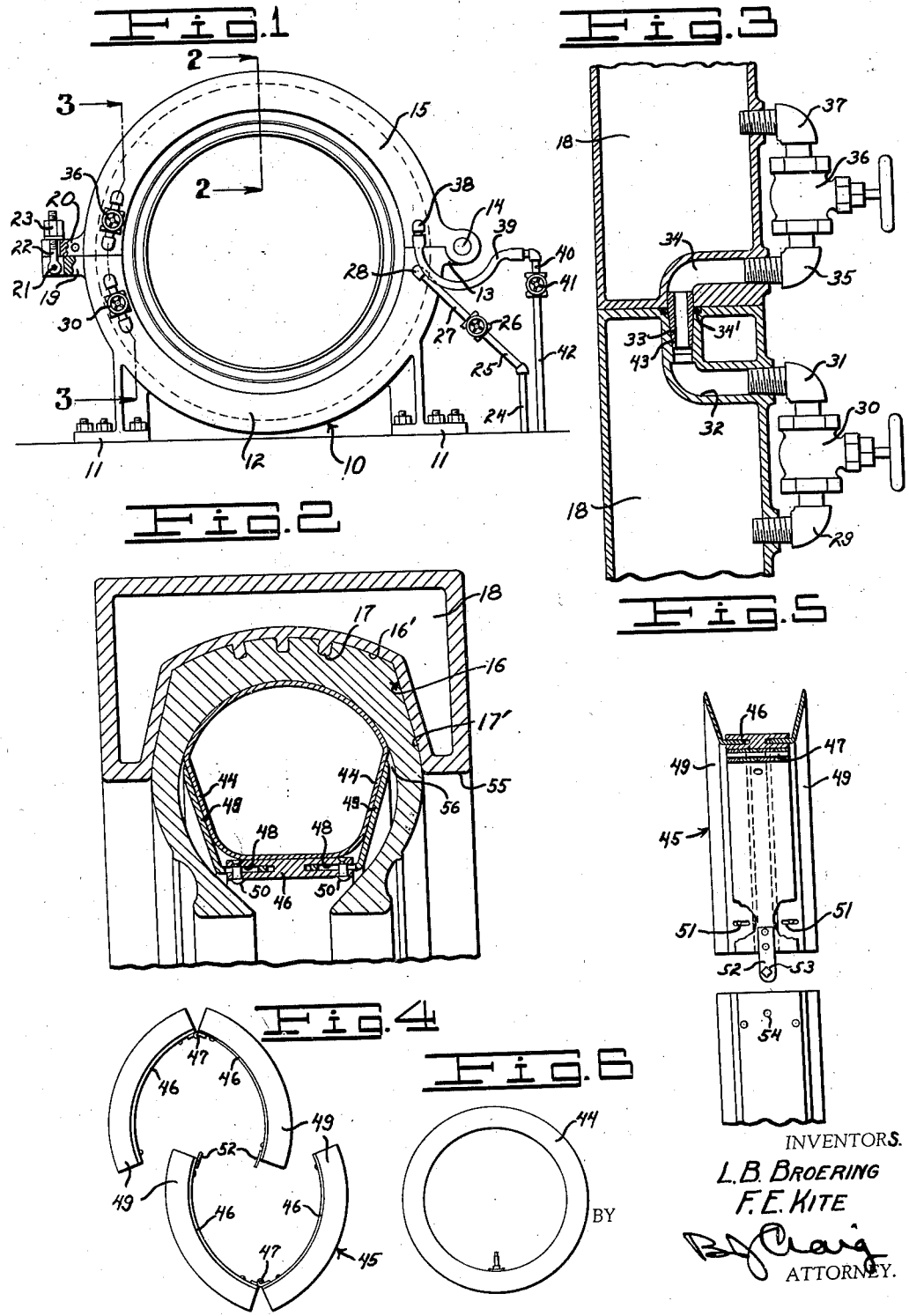

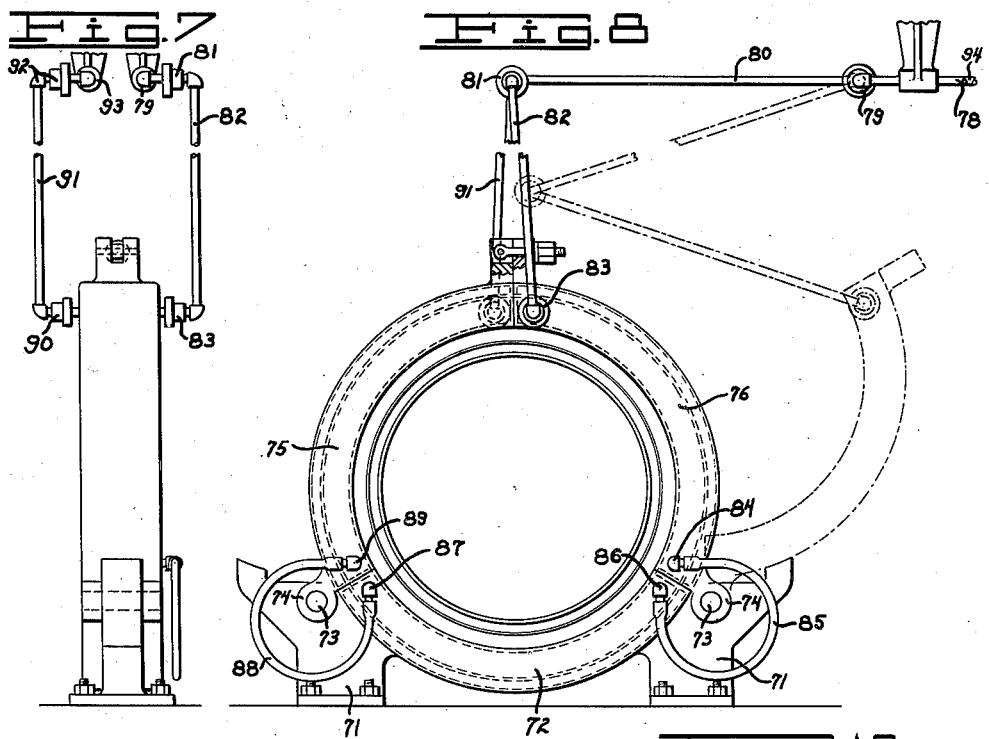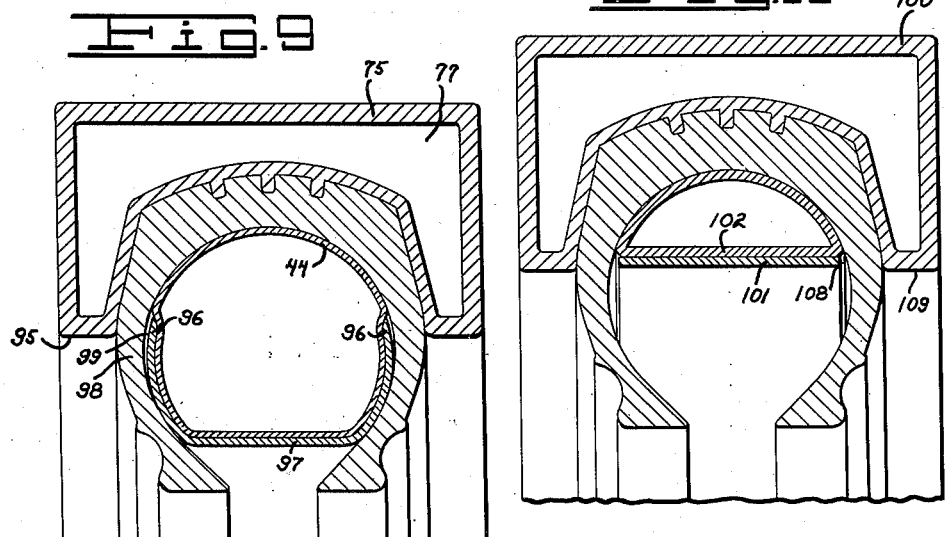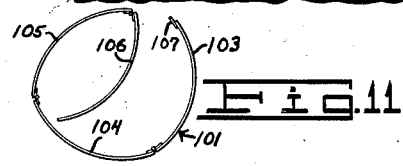

Patented July 27, 1937

2,088,130

UNITED STATES PATENT OFFICE 2,088,130

TIRE RETREADING MOLD

Lawrence B. Broering and Floyd E. Kite, Los Angeles, Calif., assignors to Kite Mold Company, a corporation of California Application May 14, 1934, Serial No. 725,542

7 Claims. (Cl. 18—18)

This invention relates to tire retreading apparatus.

The general object of our invention is to provide an improved apparatus for retreading an automobile tire.

A specific object of the invention is to provide an improved mold for curing a tread upon an automobile tire.

Another object of the invention is to provide an improved mounting on an automobile tire tread mold.

An additional object of the invention is to provide an improved circulating system for the heating fluid of a tire mold.

Another object of the invention is to provide an improved inner ring which closes the cavity in a tire when the latter is being retreaded.

Other objects and the advantages of this invention will be apparent from the following description taken in connection with the following drawings wherein:

Fig. 1 is a side elevation partly in section showing our improved tire retreading mold;

Fig. 2 is a section taken on line 2—2 of Fig. 1;

Fig. 3 is a section taken on line 3—3 of Fig. 1;

Fig. 4 is a side elevation showing the inner ring;

Fig. 5 is a section through the ring;

Fig. 6 is a side elevation of the pneumatic insert;

Fig. 7 is an end view of a modification of our invention;

Fig. 8 is a side elevation of the modification;

Fig. 9 is a section taken on line 9—9 of Fig. 8;

Fig. 10 is a section similar to Fig. 9 showing another type of ring and pneumatic insert;

Fig. 11 is a side elevation of the insert shown in Fig. 10;

Fig. 12 is an end view of a further modification of our invention;

Fig. 13 is a side elevation of the second modification;

Fig. 14 is a section on line 14—14 of Fig. 13 showing the manner in which the circulating system and the upper and lower parts of the mold are connected; and, Fig. 15 is a section on line 15—15 of Fig. 13.

Referring to the drawings by reference characters we have shown our invention as embodied in a tire retreading apparatus indicated generally at 10. As shown this apparatus includes supporting standards 11 on which a semi-circular mold member 12 is mounted. The mold member 12 includes a boss 13 in which a pivot pin 14 is mounted to support a second semi-circular mold member 15. The mold members 12 and 15 are each provided with a cavity 16 which is provided with suitable rib members 17 to form the desired tread. The wall of each of these tire cavities 16 is formed with an arcuate part 16' arcuate in cross section and with side parts 17' extending in straight lines toward the central part 16' in converging relation to each other whereby the cavity is given in cross section substantially the shape of a V having a wide arcuate base, or in other words, the shape of a U having straight sides diverging from the base.

The members 12 and 15 are each also provided with a peripherally extending cavity 18 through which the steam used in vulcanizing is circulated. These cavities 18 extend substantially throughout the width of the mold and entirely across the tread of a tire positioned therein. The members 12 and 15 are provided with bosses 19 and 20, respectively. The boss 20 is provided with a pin 21 on which a fastening member 22 is pivoted. This fastening member is threaded and a nut thereon serves to hold the parts assembled.

A steam supply pipe is shown at 24. Steam passes from this pipe to a pipe 25 which has a valve 26 secured thereto. A pipe 27 extends from the valve 26 and this pipe 27 communicates through a fitting 28 with the cavity in the lower mold member 12. From this cavity steam passes through a fitting 29 (see Fig. 3) through a valve 30 and through a fitting 31 into a passageway 32, thence, through a sleeve member 33 into a passageway 34, a fitting 35, a valve 36, a fitting 37 and the cavity 18 in the upper mold. The steam then passes through a fitting 38, a flexible hose 39, a pipe 40, a valve 41 and a return conduit 42.

The sleeve member 33 is secured rigidly in the passageway 34 and is tapered at its lower end 43 to fit a tapering portion at the end of the passageway 32. A gasket 34' is arranged about the end of the passageway 32 to provide a fluid tight joint. The sleeve member 33 moves upwardly when the mold is parted and the construction is such that when all valves are open steam passes through the circulating system of the mold. After the cure is effected the valve 26 is closed after which the valves 30, 36 and 41 are closed and the mold is parted and the cured tire is withdrawn.

In the use of our invention we first place the desired amount of raw rubber stock upon the tire and place the same in the lower mold. An air bag 44 is then inserted in place and a ring indicated generally at 45 is next inserted.

The ring 45 includes segmental portions 46 which are hinged in pairs as at 47 and slotted on opposite faces as at 48. Flange members 49 are movably retained in the slots 48 by pins 50 which pass through apertures 51 in the flanges 49. The two pairs of segments are held in alignment by lugs 52 which include set screws 53 engaging apertures 54 in the segmental portions 46.

After the parts are assembled the upper mold 15 is clamped in position by the nut 23, the air bag 44, is inflated, and the valves 26, 30, 36 and 41 are opened. The tire is allowed to cure a predetermined time after which the valves 26, 30, 36 and 41 are closed, the air bag 44 deflated, the nut 23 released, and the mold member 15 swung about the pin 14 out of the operator's way. The air bag 44 and the ring 45 are then removed and the tire is taken from the mold member 12.

The mold members 12 and 15 are similar in cross section and the inner peripheral faces 55 thereof terminate (as shown in Fig. 2) at locations within the periphery of the flanges 49 and substantially midway between the tread and bead of the tire. The flanges are more or less rigid and their extreme ends are spaced from the tire sidewall to form a space, as shown at 56. This construction prevents pinching the tire case when the air bag is inflated and prevent the exertion of any pressure from the air bag to the unconfined side walls of the tire.

A modification of our invention is shown in Figs. 7, 8 and 9. As shown this apparatus comprises supporting standards 71 having thereon a segmental mold member 72, which is provided with an upwardly facing mold cavity. The standards 71 have pins 73 mounted thereon and these pins fit apertures in lugs 74 on segmental mold members 75 and 76 which cooperate with the mold member 72 to form a complete mold cavity.

The mold members 72, 75 and 76 are each provided with peripheral cavities 77 through which the vulcanizing steam is circulated. The ends of the cavities are closed and in order to secure circulation we provide a steam inlet pipe 78 which is connected by a swivel coupling 79 to a pipe 80 which is connected by a swivel coupling 81 to a pipe 82 which is connected by a swivel coupling 83 to one end of the cavity 77, in the mold member 76. The other end of this mold cavity is connected by a fitting 84, hose 85, and fitting 86 with one end of the circulation cavity in the mold member 72. The other end of this circulation cavity is connected by a fitting 87, a hose 88 and a fitting 89 with one end of the circulation cavity in the mold member 75. The other end of this circulation cavity is connected by a swivel fitting 90 with a pipe 91 and this pipe is connected by a swivel fitting 92 with a swivel fitting 93 which is connected to a return pipe 94.

All of the mold members 72, 75 and 76 are similar in cross section and the inner peripheral faces 95 thereof terminate within the periphery of flanges 96 on a ring member 97. This ring member is shown as made of one piece of material and the flange portions are spaced at a slight distance from the wall 98 of the tire. This spacing is indicated at 99, and as the flanges are more or less rigid pressure of the air bag 44 cannot force the flanges against the tire sidewalls so that pinching is prevented.

In Fig. 10 the mold member 100 is similar to the mold members previously described but it is shown as in use with a modified ring 101, and an air bag 102, which is semi-cylindrical in cross section. The ring 101 is shown as of four segments 103, 104, 105 and 106, all hinged together with the end sections 103 and 106 having attaching means 107 to secure the ring in extended position. The ring 101 has a width less than the distance across the inside of the tire to provide a space 108 and the ring has a diameter greater than the diameter of the inner peripheral faces 109 on the mold members.

In the modification of our invention shown in Figs. 12 to 15, inclusive, a pair of spaced standards 120 support a lower mold member 121. The standards 120 support a platform 122 on which is arranged a reversible motor 123, a cable drum 124, is driven through worm gearing 125 by the motor 123. A second mold member 126 includes end portions 127 which are arranged to slide vertically on posts 128, as shown. A cable 129 is secured to the mold member at one end and passes over a pulley 130 and is then wound about the drum 124. When the motor 123 is driven in one direction the mold member 126 is raised and when the motor is driven in the reverse direction the mold member 126 is lowered upon the mold member 121.

The mold members 121 and 126 are provided with mold cavities similar to those previously described. The upper mold member is provided with a steam cavity 131 while the lower mold member 121 is provided with a steam cavity 132. The mold member 121 is provided with a conduit member 133 which is L-shaped and is fitted at one end with a nipple 134 which is connected by a fitting 135 with a steam supply pipe 136 which includes a valve 137.

The other end of the conduit 133 is provided with a tapered bore 138 in which a valve member 139 is fixed. This valve member 139 is provided with a plurality of apertures 140 through which steam passes and with a rigid upwardly directed post 141. Below the valve member 139 we arrange a pair of floating disks 142 which are normally urged against the valve 139 by a spring 143 which engages a shoulder 144 and the construction is such that the valve apertures 140 normally remain closed. The disks 142 are provided with aligned holes 145 for the passage of fluid.

The mold member 126 is provided with a downwardly projecting valve member 146, which is provided with a valve seat 147 for a ball valve 148 which is urged to its seat by a spring 149. The spring 149 is held in place by an annular member 150 through which the steam passes. The valve member 146 is provided with a plurality of pins 151 which pass through the apertures 140.

In operation when the mold member 126 is lowered upon the mold member 121 the valve member 146 enters the bore 138. The post 141 opens the valve 148 and at the same time the pins 151 move the disks 142 to open the apertures 140. It will thus be seen that when the mold members 121 and 126 are separated the valves are closed, and that when these members are together communication is established between them at one end.

In order to provide communication between the steam cavities at their other ends, the upper mold member 126 is provided with a valve member 152 which fits in the tapered bore 153 of a boss 154 which projects into the steam cavity 132 in the lower mold member 121. The valve member 152 is in all respects like the valve member 146 and it coacts with a valve 155 which comprises disks to provide a valve construction and flow control means which is similar in all respects to that described in Fig. 14.

In operation a tire is placed on the lower mold member 121, the air bag and ring are then inserted and the motor 123 operated to lower the mold member 126. The air bag is inflated and the valve 137 is then opened and steam passes through the mold member 126, into the mold member 121 and passes from this later mold member through a pipe 156 which includes a valve 157. After the cure is effected the motor 137 is operated in a reverse direction to lift the mold member 126 and a finished tire is then removed.

From the foregoing description it will be apparent that we have provided a novel tire retreading apparatus which is simple in construction and which is highly efficient in use.

Having thus described our invention, we claim:

1. In a tire retreading apparatus, a base having a segmental mold member fixed thereon, a pair of segmental mold members pivotally mounted for movement towards and from each other, each of said mold members having steam cavities therein, means to connect each end of the steam cavity in the fixed mold member to the adjacent end of the steam cavity in the movable mold members, and means to connect the adjacent ends of the steam cavities in the movable mold members, said last mentioned means including pipes pivotally mounted on the movable mold members, a live steam pipe swivelly connected with one of said pipes and an exhaust steam pipe swivelly connected with the other steam pipe.

2. In a tire retreading apparatus, a base having a segmental mold member fixed thereon, a pair of segmental mold members swingably attached thereto, each of said mold members having steam cavities therein, means for connecting the steam cavity of the fixed mold member to the steam cavities of the movable mold members, and means to connect the steam cavities of the movable mold members, said last mentioned means including tubular means pivotally mounted on the movable mold members, a line steam pipe swivelly connected with one of said tubular means and an exhaust pipe swivelly connected with the other of said tubular means.

3. In a tire retreading apparatus, a base having a segmental mold member fixed thereon, a pair of segmental mold members swingably attached thereto, each of said mold members having steam cavities therein, means for connecting the steam cavity of the fixed mold member to the steam cavities of the movable mold members and means for supplying and exhausting steam to said cavities, said last mentioned means including pipes swivelly connecting one of said movable segments to a steam inlet pipe and pipes swivelly connecting the other of said movable segments to a fluid outlet pipe.

4. In a tire retreading apparatus, a vertical circular mold formed of end opening hinged segments and having its inner face formed with a tire cavity adapted to receive a tire with a thickness of retreading stock applied thereto, each of said segments having a circumferentially extending steam cavity projecting laterally entirely across the tread of the tire throughout the length of the steam cavity, said tire cavity having in cross section an arcuate central part and straight side parts merging into the central part in converging relation to each other, the side walls of said mold being relatively short and terminating substantially midway between the tread and bead of the tire, a circular air bag within the tire, and a substantially U-shaped floating rim having its edge portions terminating adjacent the edges of the mold and spaced inwardly therefrom a distance materially greater than the thickness of the side walls of the tire to prevent the exertion of any pressure from the air bag to the side walls of the tire.

5. In a tire retreading apparatus, a full circle mold formed of end opening hinged segments and having its inner face formed with a tire cavity adapted to receive a tire with a thickness of retreading stock applied thereto, each of said segments having a circumferentially extending steam cavity projecting laterally entirely across the tread of the tire throughout the length of the steam cavity, said tire cavity having in cross section an arcuate central part and straight side parts merging into the central part in converging relation to each other, the side walls of said mold being relatively short and terminating substantially midway between the tread and bead of the tires, pressure means within the tire for compressing the same against the side walls of the tire cavity, and means adjacent the edges of the mold and spaced inwardly therefrom a distance materially greater than the thickness of the side walls of the tire to prevent the exertion of any pressure from said pressure means to the side walls of the tire.

6. In a tire retreading apparatus, a full circle mold having its inner face formed with a tire cavity adapted to receive a tire with a thickness of retreading stock applied thereto and further having a circumferentially extending steam cavity projecting laterally entirely across the tread of the tire throughout the length of the steam cavity, said tire cavity having in cross section an arcuate central part and straight side parts merging into the central part in converging relation to each other, the side walls of said mold being relatively short and terminating substantially midway between the tread and bead of the tire, pressure means within the tire for compressing the same against the walls of the tire cavity, and means adjacent the edges of the mold to prevent the exertion of any pressure from said pressure means to the side walls of the tire.

7. In a tire retreading apparatus, a full circle mold having a steam cavity and further having its inner face formed with a tire cavity adapted to receive a tire with a thickness of retreading stock applied thereto, said tire cavity having an arcuate central part and straight side parts merging into the central part in converging relation to each other, pressure means within the tire for compressing the same against the walls of the tire cavity, and means for cutting off the pressure from said pressure means to the tire substantially midway between the tread and bead of the latter.

LAWRENCE B. BROERING.
FLOYD E. KITE.